United States Patent
Foley et al.

(10) Patent No.: US 9,090,113 B1
(45) Date of Patent: Jul. 28, 2015

(54) SYSTEM FOR DETECTING INOPERATIVE EJECTORS IN THREE-DIMENSIONAL OBJECT PRINTING USING A PNEUMATIC SENSOR

(71) Applicant: Xerox Corporation, Norwalk, CT (US)

(72) Inventors: Timothy P. Foley, Marion, NY (US); Paul S. Bonino, Ontario, NY (US); Raymond J. Clark, Webster, NY (US); Frank B. Tamarez Gomez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/231,266

(22) Filed: Mar. 31, 2014

(51) Int. Cl.
*B41J 29/393* (2006.01)
*B33Y 30/00* (2015.01)

(52) U.S. Cl.
CPC ............... *B41J 29/393* (2013.01); *B33Y 30/00* (2014.12)

(58) Field of Classification Search
CPC .... B41J 29/393; B41J 2/0458; B41J 2/04563; B33Y 30/00
See application file for complete search history.

(56) References Cited

U.S. PATENT DOCUMENTS

| | | | |
|---|---|---|---|
| 6,286,929 B1* | 9/2001 | Sharma et al. | 347/27 |
| 8,017,055 B2* | 9/2011 | Davidson et al. | 264/308 |
| 2004/0012112 A1 | 1/2004 | Davidson et al. | |
| 2006/0111807 A1 | 5/2006 | Gothait et al. | |
| 2006/0141145 A1 | 6/2006 | Davidson et al. | |
| 2008/0006334 A1* | 1/2008 | Davidson et al. | 137/571 |
| 2009/0011066 A1 | 1/2009 | Davidson et al. | |
| 2010/0151136 A1 | 6/2010 | Davidson et al. | |

FOREIGN PATENT DOCUMENTS

WO 03/026876 A2 4/2003

* cited by examiner

*Primary Examiner* — Manish S Shah
*Assistant Examiner* — Jeremy Delozier
(74) *Attorney, Agent, or Firm* — Maginot Moore & Beck LLP

(57) ABSTRACT

An apparatus detects inoperative ejectors during printing of three-dimensional objects. The apparatus operates the printhead or printheads in the printer to form test pattern on a substrate. A pneumatic sensor directs a pneumatic stream towards substrate and measures the pneumatic impedance. The impedance differences between area where the test pattern is formed and bare areas are analyzed to identify inoperative inkjets.

15 Claims, 4 Drawing Sheets

SYSTEM FOR DETECTING INOPERATIVE EJECTORS IN THREE-DIMENSIONAL OBJECT PRINTING USING A PNEUMATIC SENSOR

TECHNICAL FIELD

The device disclosed in this document relates to printers that produce three-dimensional objects and, more particularly, to accurate detection of inoperative ejectors in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the ejectors in the printheads that eject the drops of material that form the objects. During printing of an object, one or more ejectors can deteriorate by ejecting the material at an angle, rather than normal, to the printhead, ejecting drops that are smaller than an ejector should eject, or by failing to eject any drop at all. An ejector suffering from any of these operational deficiencies is known as an inoperative ejector. If the operational status of one or more ejectors deteriorates during object printing, the quality of the printed object cannot be assessed until the printing operation is completed. Consequently, print jobs requiring many hours or multiple days can produce objects that do not conform to specifications due to inoperative ejectors in the printheads. Once such objects are detected, the printed objects are scrapped, restorative procedures are applied to the printheads to restore ejector functionality, and the print job is repeated. An apparatus that enables detection of inoperative ejectors while printing would enable restorative procedures to be applied during object printing so a properly formed object can be produced. In this manner, product yield for the printer is improved and its printing is more efficient. The apparatus should be able to detect inoperative ejectors that eject a multitude of printing materials, such as clear, colored, translucent, phosphorescent, and waxy materials.

SUMMARY

An apparatus that enables inoperative ejector detection in three-dimensional printers includes a pressure source positioned to direct a pneumatic flow towards a surface of a substrate, a pressure sensor configured to generate a signal corresponding to an impedance to the pneumatic flow onto the surface of the substrate, and a controller operatively connected to the pressure source and the pressure sensor, the controller being configured to activate the pressure source selectively, to receive the signal generated by the pressure sensor while the pressure source is directing pneumatic flow onto the surface of the substrate, and to detect inoperative ejectors in a printhead with reference to the signal received from the pressure sensor and a predetermined pattern used to operate a printhead to eject material onto the substrate.

A printer that incorporates the apparatus for detecting inoperative ejectors includes a substrate having a surface, a printhead configured to eject material onto the surface of the substrate, a pressure source positioned to direct a pneumatic flow onto the surface of the substrate, a pressure sensor configured to generate a signal corresponding to an impedance to the pneumatic flow onto the surface of the substrate, and a controller operatively connected to the printhead, the pressure source and the pressure sensor, the controller being configured to operate the printhead to eject material onto the surface of the substrate with reference to a predetermined pattern, to activate the pressure source selectively, to receive the signal generated by the pressure sensor while the pressure source is directing pneumatic flow onto the surface of the substrate, and to detect inoperative ejectors in the printhead with reference to the signal received from the pressure sensor and the predetermined pattern.

BRIEF DESCRIPTION OF THE DRAWINGS

The foregoing aspects and other features of an apparatus or printer that detects inoperative ejectors during three-dimensional printing are explained in the following description, taken in connection with the accompanying drawings.

DETAILED DESCRIPTION

Figure 1:
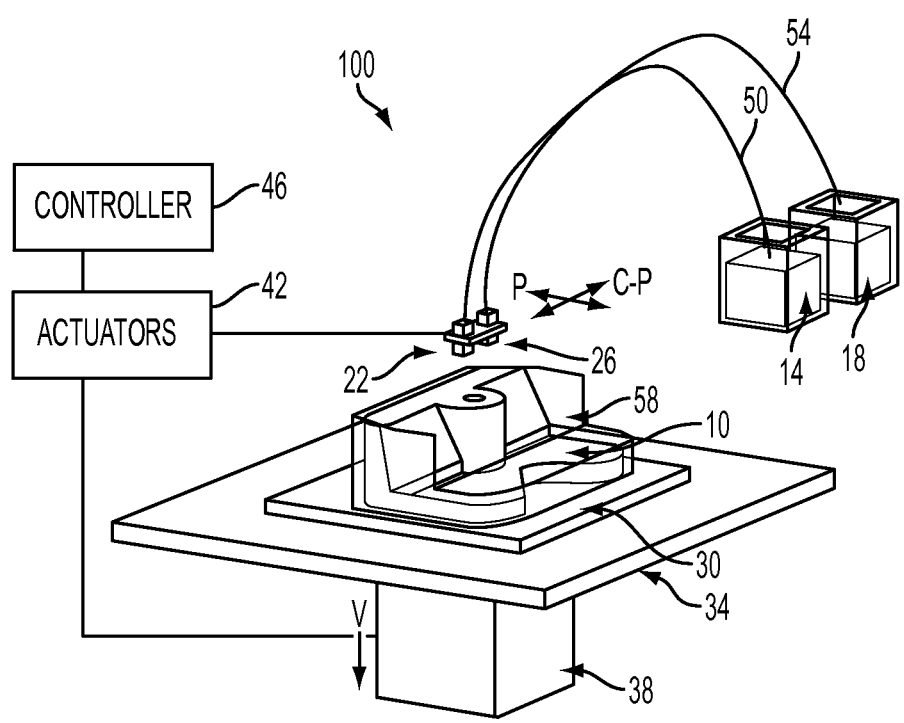
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of ejector printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both ejector printheads are operated by the controller 50 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. After the part is finished, the support structure 58 is removed by washing, blowing, or melting.

The controller 46 is also operatively connected to at least one and possibly more actuators to control movement of the planar support member 34, columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to either the planar support member 34 or the columnar support member 38 to move the surface on which the part is being produced in the process and cross-process directions. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 are configured with an actuator to move in a direction that is orthogonal to the planar support member 34. This direction is called the vertical direction in this document and is denoted with the letter "V" in FIG. 1. Movement in the vertical direction can be effected by one or more actuators operatively connected to the columnar support member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
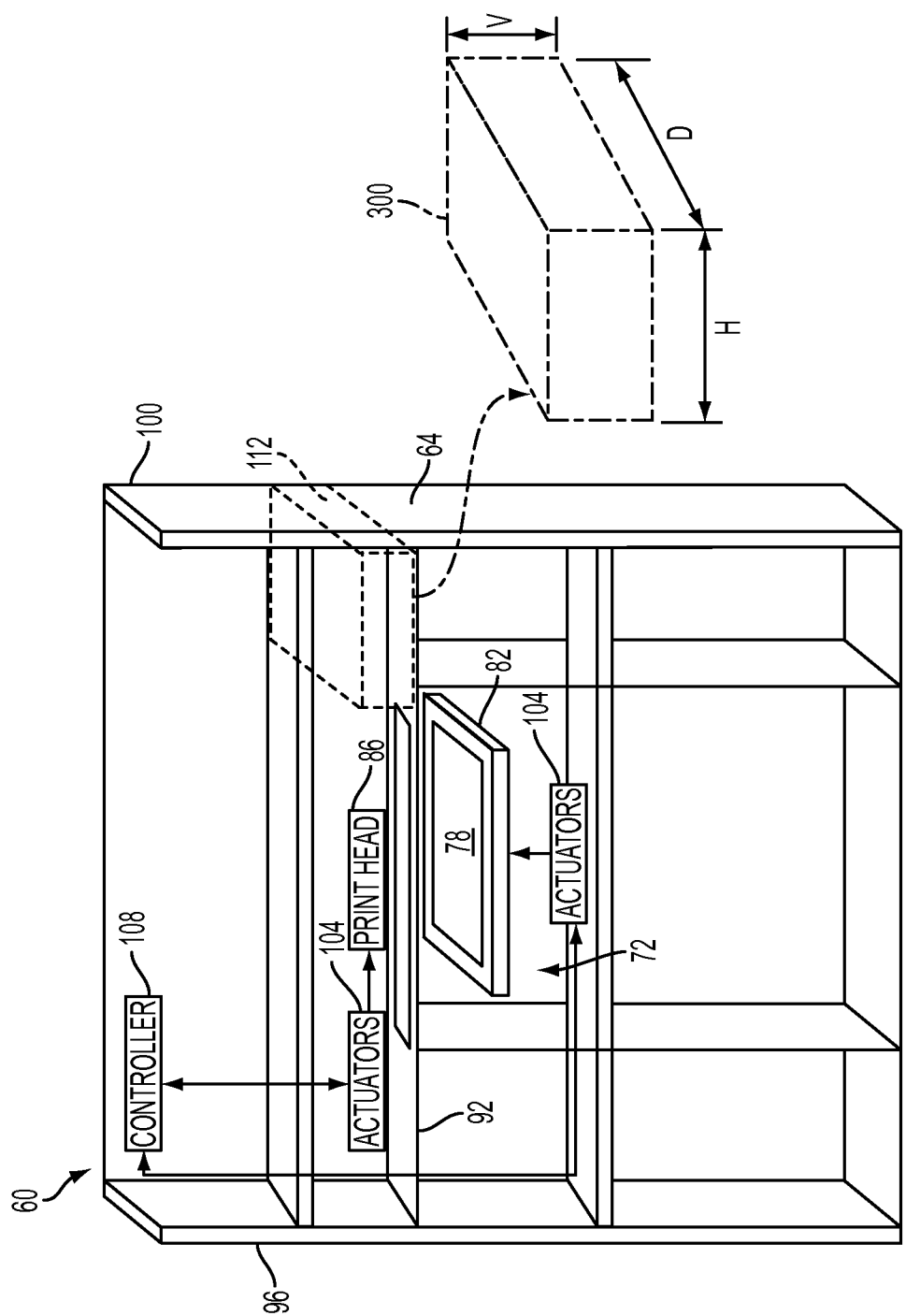
FIG. 2 is front view of a three-dimensional object printer having a housing that depicts a space within the housing for a module that enables inoperative ejectors in the printhead to be detected during a printing operation.

A three-dimensional object printer having a housing is shown in FIG. 2. That printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the ejectors in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that uses a pneumatic sensor to detect inoperative ejectors in the printer 60. As noted above, if an ejector fails during printing of an object by either completely or partially failing to eject material or by errantly ejected material in a skewed direction, the object being produced is malformed. Currently, this malformation cannot be detected until production of the object is finished. By using area 112 for pneumatically sensing inoperative ejectors, printer 60 can be configured to detect inoperative ejectors during object production as described more fully below. Some components within the module 300 can move in the horizontal direction H, depth direction D, and vertical direction V as shown in the figure.

Figure 3:
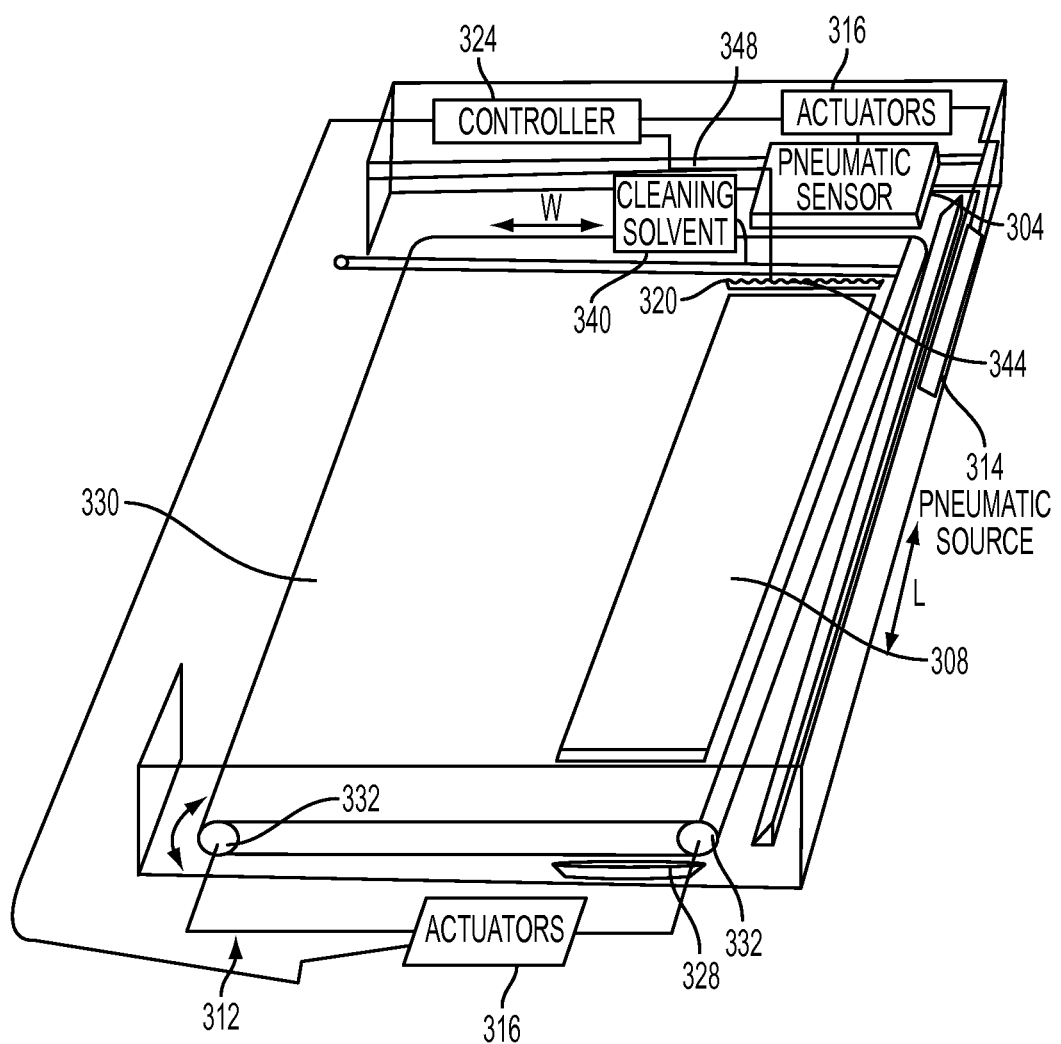
FIG. 3 is a perspective view of a module for detecting inoperative ejectors that fits in the space shown in FIG. 2.

One embodiment of a module that detects inoperative ejectors ejecting clear materials during object printing is shown in the block diagram of FIG. 3. The module 300 is configured to fit within area 112 of printer 60. The module 300 includes a pneumatic sensor 304, a substrate 308, a substrate transport 312, a pressurized pneumatic source 314, one or more actuators 316, a cleaning member 320, a controller 324, and a waste receptacle 328. The pneumatic sensor 304 is configured for bidirectional movement in both directions W and L by an actuator 316. This configuration enables pneumatic sensor 304 to move over the surface of endless belt 330. The controller 324 is operatively connected to the actuators 316 to move the pneumatic sensor 304, to move the substrate 308 with the belt 312, and to sweep the substrate 308 with the cleaning member 320. Alternatively, the pneumatic sensor 304 can be fixedly mounted to the printhead 86 so controller 108 can operate actuators 104 to move the printhead and the sensor 304. In some embodiments, pneumatic sensor 304 need only be configured to move bi-directionally in direction L provided the sensor is at least as wide as substrate 308.

The substrate 308 is a planar member made of a material that supports the build material and the support material ejected from the printhead 86. The endless belt 330 is entrained about rollers 332. An actuator 316 drives the rollers 332 to rotate the belt bi-directionally to move the substrate 308 to a position where it can be printed and then to a position where it can be cleaned. The pneumatic sensor 304 can be one dimensional, that is, linear, or two dimensional array of pneumatic jets and impedance detectors, such as those manufactured by Edmunds Gages of Farmington, Conn. The pneumatic jets direct a pneumatic stream towards the surface of the substrate printed with the deposits of build and support material that form the test pattern on the substrate. An impedance detector measures the impedance encountered by the pneumatic flow. Where the pneumatic flow encounters a deposit of build or support material that extends from the substrate towards the pneumatic jet, the impedance is greater than the impedances where the substrate is bare or the mass of the material is less than the amount ejected by the predetermined number of drops ejected. By receiving the impedance measurements as the pneumatic sensor 304 is moved across the substrate 332, the areas where the deposits have been formed on the substrate with the expected mass of material for the number of drops ejected can be located. The positions of the material piles are compared to the expected positions for the piles in the test pattern to identify inoperative ejectors in the printhead 86. The pneumatic stream can be a stream of ambient air, although other gases can be used. The pneumatic stream is produced by the pressurized pneumatic source 314, which is fluidly connected to the pneumatic jets in the pneumatic sensor 304. When the sensor 304 is passed over the substrate 308, the sensor 304 generates electrical signals that form data of the test pattern on the substrate 308.

Figure 4:
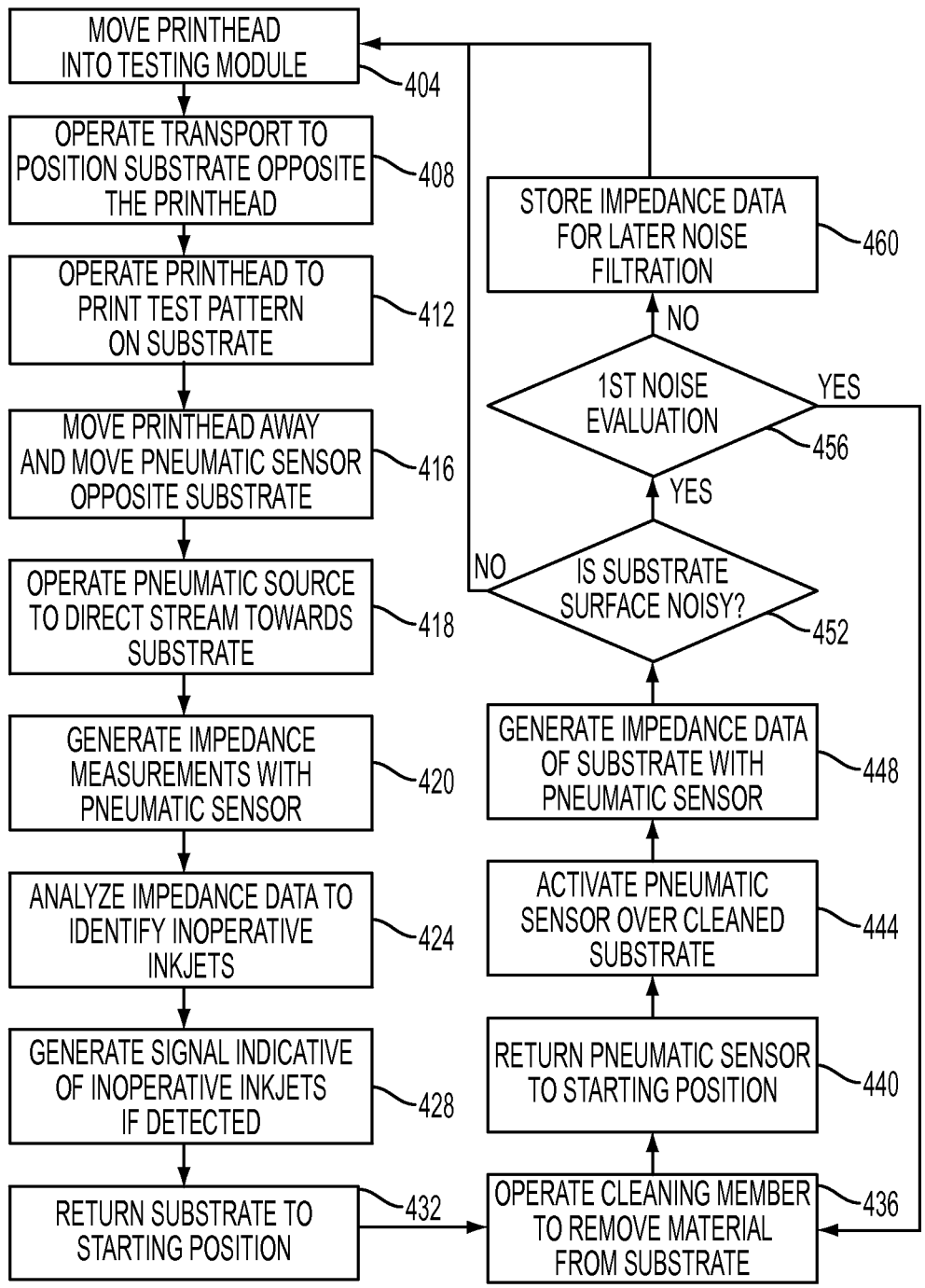
FIG. 4 is a flow diagram of a method for operating the module of FIG. 3.

A method of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 404). In response to the controller 324 detecting the printhead in the module 300, controller 324 operates the transport 312 to move substrate 308 opposite the printhead 86 (block 408). Controller 324 then generates a signal to the controller 108 to operate the ejectors in the printhead to print a test pattern on the substrate 308 (block 412). In one embodiment, each ejector in the printhead is repetitively operated to form a pile of material, also called a test dot, on a portion of the substrate 308 opposite the ejector. After the test pattern is printed, controller 108 moves the printhead 86 out of the module 300 and generates a signal for controller 324. In response to the signal from controller 108, controller 324 operates an actuator 316 to move the pneumatic sensor 304 to a position opposite the test pattern on the substrate 308 (block 416). This movement can be accomplished by moving the pneumatic sensor to the side of the module where the substrate 308 was printed or the actuator driving rollers 332 can be operated to move the substrate to the side where the pneumatic sensor is located. The controller 324 then activates the pneumatic source 314 to direct a pneumatic stream towards the substrate 332 (block 418). The process continues by operating an actuator to move the pneumatic sensor 304 in the direction L over the substrate 308 to generate electrical signals that are provided to the controller 324 as pneumatic impedance data of the planar surface of the substrate 308 (block 420). The areas where build material and support material have been ejected have higher measured impedances than the bare substrate or low mass piles of material as explained above. The contrast between the portions of the surface that have higher measured impedances than those impedances where the substrate is bare or has a smaller than an expected mass of build or support material should correspond to the test pattern used to eject the build and support material. The data regarding the measured impedances for the planar surface are analyzed with reference to expected positions for the build and support material used to form the test pattern to identify inoperative ejectors (block 424) and, if inoperative ejectors are identified, a signal indicative of the defective printhead is generated for the operator of the printer (block 428). The operator can then take appropriate action. If the pneumatic impedances for the substrate were measured while the substrate was at the position where it was printed, the process continues by the controller 324 operating an actuator 316 to rotate the transport 312 in reverse and return the substrate to its starting position (block 432). Otherwise, the substrate is already in position for cleaning. Controller 324 operates an actuator 316 to engage the substrate 308 with the cleaning member 320 and then move the cleaning member 320 in direction L to remove material from the substrate (block 436). The removed material is collected in the waste receptacle 328, which is shown in the figure as being positioned at the forward end of the endless belt 330, although other positions and directions of cleaning member movement can be used. The receptacle 328 can be removed from the printer from time to time and either replaced or emptied and then re-installed. If the substrate was tested in the position where it was printed, the controller 324 operates actuator 316 to return the pneumatic sensor 304 to the position over the substrate 308 (block 440).

The process of FIG. 4 in some embodiments continues with an evaluation of the substrate cleaning. In these embodiments, the controller activates a pneumatic sensor after the cleaner has removed ink from the surface of the substrate (block 444), and moves the pneumatic sensor over the substrate to generate pneumatic impedance data of the cleaned substrate (block 448). These impedance data are compared to a predetermined threshold to identify where the pneumatic impedances indicate material is present on the surface of the substrate (block 452). If the threshold is being exceeded, noise is present in the impedance data received from the pneumatic sensor. In response to the detection of noise, another cleaning operation can be performed (blocks 436-440) and another evaluation of the cleaning occurs (blocks 444-452). If the substrate has been cleaned more than once in the present test (block 456), the pneumatic sensor data of at least a portion of the substrate is stored in memory operatively connected to the controller (block 460). These noise data are subtracted from pneumatic sensor data obtained in the next testing of the printhead to enable identification of the test pattern without the interference of the noise so the controller can detect inoperable inkjets.

The cleaning member 320 is mounted to a support member 348 that is operatively connected to an actuator 316. As noted above, the controller 324 operates the actuator to move the support member 348 to swipe the substrate 308 with the cleaning member 320. This action sweeps build and support material from the substrate 308 into the waste receptacle 328 to renew the surface of substrate for another test pattern printing. The cleaning member 320 can include a supply of cleaning solvent 340 that is configured to spread cleaning solvent onto the substrate before the cleaning member sweeps the substrate. The cleaning solvent chemically interacts with the build and support material to loosen the material before the cleaning member encounters it. Additionally or alternatively, a heater 344 can be operatively connected to the controller for selectively connecting the heater to a power supply. The heater is positioned with respect to the cleaning member 320 to heat the build and support material before the cleaning member sweeps the substrate 308.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer for forming objects comprising:
a substrate having a surface;
a printhead configured to eject material onto the surface of the substrate;
a pressure source positioned to direct a pneumatic flow onto the surface of the substrate;
a pressure sensor configured to generate a signal corresponding to an impedance to the pneumatic flow onto the surface of the substrate;
a cleaner configured to remove ink from at least a portion of the surface of the substrate; and
a controller operatively connected to the cleaner, the printhead, the pressure source and the pressure sensor, the controller being configured to operate the printhead to eject material onto the surface of the substrate with reference to a predetermined pattern, to activate the pressure source selectively, to receive the signal generated by the pressure sensor while the pressure source is directing pneumatic flow onto the surface of the substrate, to detect inoperative ejectors in the printhead with reference to the signal received from the pressure sensor and the predetermined pattern, to operate the cleaner to remove ink from the at least a portion of the surface of the substrate, to activate the pressure source after the cleaner has removed ink from the surface of the substrate, and to identify noise in the substrate with reference to the signal received from the pressure sensor.

2. The printer of claim 1 wherein the pneumatic flow is an air flow.

3. The printer of claim 1 further comprising:
a plurality of pressure sources and pressure sensors arranged in one-to-one correspondence with one another and in an array that corresponds with at least a portion of the predetermined pattern.

4. The printer of claim 1, the controller being further configured to operate the cleaner to remove ink from the substrate in response to the identified noise in the pneumatic impedance data exceeding a predetermined threshold.

5. The printer of claim 1, the controller being further configured to store in a memory operatively connected to the controller at least a portion of the pneumatic impedance data used to identify the noise and to detect the inoperative ejectors with reference to the at least a portion of the signal from the pressure sensor used to identify the noise stored in the memory.

6. The printer of claim 1, the cleaner further comprising:
a member configured to engage the at least a portion of the surface of the substrate and move with respect to the at least a portion of the surface; and
an actuator operatively connected to the member and to the controller to enable the controller to operate the actuator to move the member with respect to the at least a portion of the surface of the substrate.

7. The printer of claim 1, the cleaner further comprising;
an applicator operatively connected to a supply of solvent; and
the controller being further configured to operate the applicator to apply solvent to the at least a portion of the surface of the substrate to remove ink from the at least a portion of the surface of the substrate.

8. The printer of claim 1, the cleaner further comprising:
a heater positioned to heat the at least a portion of the surface of the substrate; and
the controller being further configured to operate the heater to heat the at least a portion of the surface of the substrate to remove material from the at least a portion of the surface of the substrate.

9. An apparatus for detecting inoperative ejectors in a printer comprising:
a pressure source positioned to direct a pneumatic flow towards a surface of a substrate;
a pressure sensor configured to generate a signal corresponding to an impedance to the pneumatic flow onto the surface of the substrate;
a cleaner configured to remove material from at least a portion of the surface of the substrate; and
a controller operatively connected to the pressure source and the pressure sensor, the controller being configured to activate the pressure source selectively, to receive the signal generated by the pressure sensor while the pressure source is directing pneumatic flow onto the surface of the substrate, to detect inoperative ejectors in a printhead with reference to the signal received from the pressure sensor and a predetermined pattern used to operate a printhead to eject material onto the substrate, to operate the cleaner to remove material from the at least a portion of the surface of the substrate, to activate the pressure source after the cleaner has removed material from the surface of the substrate, and to identify noise in the substrate with reference to the signal received from the pressure sensor.

10. The apparatus of claim 9 further comprising:
a plurality of pressure sources and pressure sensors arranged in one-to-one correspondence with one another and in an array that corresponds with at least a portion of the predetermined pattern.

11. The apparatus of claim 9, the controller being further configured to operate the cleaner to remove material from the substrate in response to the identified noise in the pneumatic impedance data exceeding a predetermined threshold.

12. The apparatus of claim 9, the controller being further configured to store in a memory operatively connected to the controller at least a portion of the pneumatic impedance data used to identify the noise and to detect inoperable ejectors with reference to the at least a portion of the signal received from the sensor used to identify the noise stored in the memory.

13. The apparatus of claim 9, the cleaner further comprising:
a member configured to engage the at least a portion of the surface of the substrate and move with respect to the at least a portion of the surface; and
an actuator operatively connected to the member and to the controller to enable the controller to operate the actuator to move the member with respect to the at least a portion of the surface of the substrate.

14. The apparatus of claim 9, the cleaner further comprising;
an applicator operatively connected to a supply of solvent; and
the controller being further configured to operate the applicator to apply solvent to the at least a portion of the surface of the substrate to remove material from the at least a portion of the surface of the substrate.

15. The apparatus of claim 9, the cleaner further comprising;
a heater positioned to heat the at least a portion of the surface of the substrate; and
the controller being further configured to operate the heater to heat the at least a portion of the surface of the substrate to remove material from the at least a portion of the surface of the substrate.

* * * * *